United States Patent [19]
Gass

[11] Patent Number: 4,573,734
[45] Date of Patent: Mar. 4, 1986

[54] UNISOCKET CONSTRUCTION FOR FRONT COMPARTMENT OF A UNITIZED AUTOMOBILE BODY

[76] Inventor: Gene C. Gass, 315 N. Masterson, Virden, Ill. 62690

[21] Appl. No.: 679,698

[22] Filed: Dec. 10, 1984

[51] Int. Cl.$^4$ ............................................. B62D 25/08
[52] U.S. Cl. .................................... 296/189; 296/194; 296/196; 296/197; 293/134
[58] Field of Search ............... 296/189, 188, 194, 197, 296/198, 205, 185, 196

[56] References Cited

U.S. PATENT DOCUMENTS

| | | | |
|---|---|---|---|
| 3,718,364 | 2/1973 | Fischer et al. | 296/189 |
| 3,819,224 | 6/1974 | Casey et al. | 296/189 |
| 4,429,914 | 2/1984 | Bez et al. | 296/188 |
| 4,440,435 | 4/1984 | Norlin | 296/189 |
| 4,466,653 | 8/1984 | Harasaki | 296/189 |
| 4,469,368 | 9/1984 | Eger | 296/188 |

FOREIGN PATENT DOCUMENTS

683437  3/1964  Canada ................. 296/197

*Primary Examiner*—Robert R. Song
*Attorney, Agent, or Firm*—McCaleb, Lucas & Burgman

[57] ABSTRACT

A pair of removable inner side panel assemblies and a front cross panel respectively define the inner side walls and the front wall of a replaceable front compartment of a unitized automobile body. Lower rails along the inner side panel assemblies comprise: horizontal rear extensions telescopically connectible with lower socket members fastened along the undersides of the driver compartment; horizontal front portions at a higher level with forwardly open sockets; and diagonal intermediate portions between the rear extensions and the front portions to provide sacrificial bending under collision-magnitude backward forces. Upper rails are provided along the back portions of the upper margins of the inner side panel assemblies. The upper rails have horizontal rear extensions telescopically connectible with upper socket members fastened to front pillars at opposite sides of the driver compartment. Hollow reinforcing plugs extending backwardly from the front cross panel are telescopically connected in the forwardly open sockets at the front portions of the lower rails. Bumper energy absorbers are fitted within the hollow plugs. Bolted flanges along the rear margins of the inner side panel assemblies and bolted connections between the rear ends of the rails and the socket members enable the entire front compartment to be removed and replaced. An optional embodiment is shown without the reinforcing plugs.

5 Claims, 10 Drawing Figures

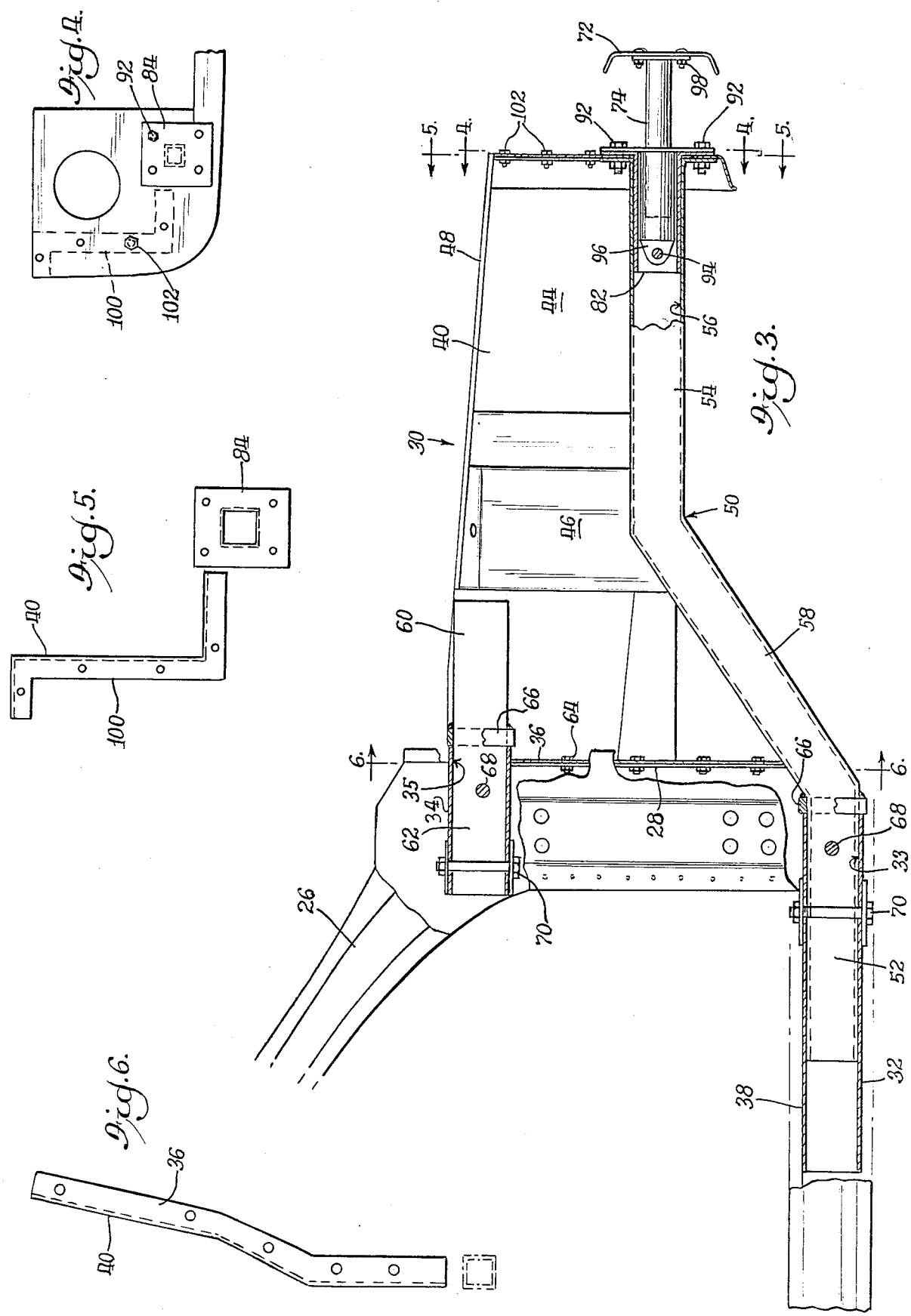

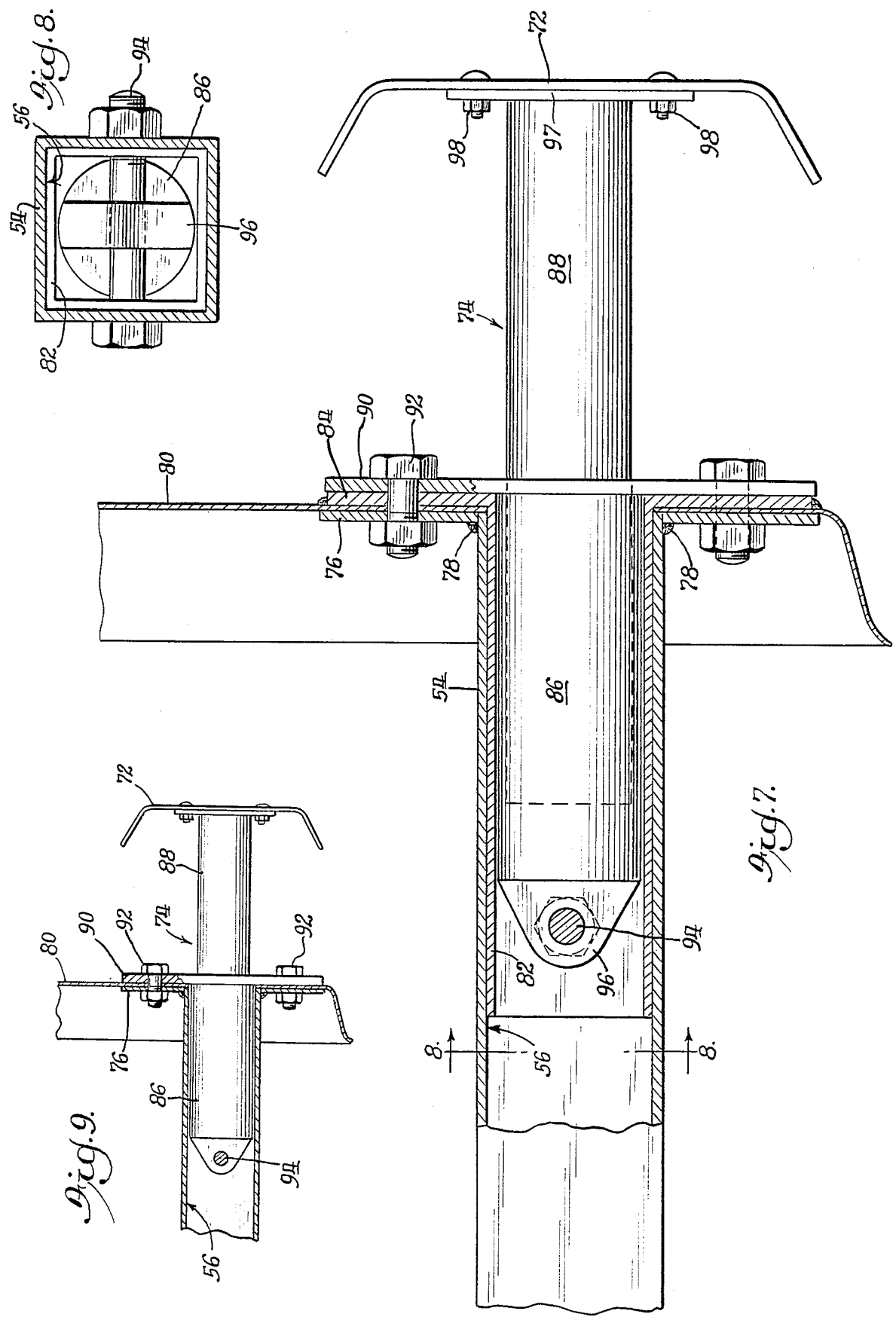

UNISOCKET CONSTRUCTION FOR FRONT COMPARTMENT OF A UNITIZED AUTOMOBILE BODY

BACKGROUND OF THE INVENTION

This invention relates to a unitized automobile body construction, sometimes called a unibody, and more particularly to a front compartment which is readily removable and replaceable to facilitate repair of collision damage.

Automobiles were originally made with separate body and frames spring-mounted onto front and rear axle assemblies.

Beginning about 20 years ago in Europe, and more recently in the United States, automobile manufacturers adopted the unibody style which uses a one piece lightweight steel structure instead of the traditional separate frame and body. Among the advantages are reduced first cost, more usable passenger room, a smaller body, and lighter weight which greatly improves fuel economy. American manufacturers have switched over more than 80% of their production to unibodies.

Aside from these advantages, the unibodies have a serious drawback in that repair of collision damage is much more difficult and expensive resulting in higher maintenance and insurance costs. The great majority of accidents result in damage to the front and of at least one of the cars involved. Inasmuch as the inner side panels of the front compartment are integral with the rest of the body and they provide primary structural support for the engine, front wheels and steering mechanism, a substantial number of collisions result in total loss of the car because the cost of refabricating the front end with the precision needed for safe operation is too high to be practicable.

The unibody structure actually supports the weight of the car. If it is only fractionally out of alignment, it can be undrivable or unsafe. Without a chassis, the unibody skin must be so precise that there is only about a 3-millimeter margin for error in supporting the wheel and steering components. Serious collision damage involving distortion of the inner side panels along the front or engine compartment can be corrected only by the use of jigs, and elaborate and expensive measuring devices, precision support benches, and heavy-duty power bending equipment.

The pieces of steel that make up the unibody are progressively overlapped and welded, sometimes by several feet, in manufacture and the welded joints are covered or inaccessible in the final assembly. Repairing or replacing one section may require dismantling several sections, pushing costs up.

A practice called "clipping" is used for repairing seriously-damaged unibody cars. This entails combining a good rear end from one car with a good front end from another, but this is far from satisfactory because it is economically impracticable to weld the two halves together and produce an assembly duplicating factory integrity and specifications.

As a further complication, the automobile industry now uses light gauge steel that cannot tolerate the intense welding heat as well as the heavier gauge steel used in older cars. Many repairs on unibody cars are merely cosmetic, it being impracticable to duplicate the original strength of the assembled parts.

Car owners are paying for this in two ways: increasing insurance premiums; and increasing numbers of cars which are declared total losses; all of which results in higher overall costs to the public generally.

SUMMARY OF THE INVENTION

It is a general object of the present invention to provide a front compartment of a unibody car which is readily removable and replaceable without welding to facilitate repair of collision damage and to greatly reduce the number of cars which are classed as total losses and scrapped.

Another object is to provide a pair of inner side panel assemblies for the front compartment which are simple in design, quickly and easily removed and replaced to fully achieve factory integrity, strength and precision by completely duplicating original construction, and produce significant savings in labor and repair time while returning the car to original factory specifications.

Another object is to provide replaceable side panel assemblies with a unisocket construction, including telescopically assembleable rail and socket components with shoulders enabling them to be self-aligning when assembled, thereby virtually eliminating the need for jigs, and elaborate and expensive measuring devices conventionally used in repairing front end wrecks.

Another object is to obtain a faster, more accurate, and less expensive repair of a wrecked front compartment than is possible by present "clipping" methods.

Another object is to make front end repairs safer and prevent injuries or deaths, and minimize causes for litigation arising out of faulty repair practices and lack of expertise in carrying out all-welded repair methods, thereby providing advantages to car owners, body repair shops, insurance companies alike, and the general public.

BRIEF DESCRIPTION OF THE DRAWINGS

Other objects and advantages of the present invention will become more apparent as this description proceeds, when considered in connection with the accompanying drawings in which:

FIG. 3 is a right side view of FIG. 1 with certain components removed and others cross sectioned to better illustrate the construction;

FIG. 4 is a front end view of FIG. 3 taken along line 4—4;

FIG. 5 is a vertical sectional view of FIG. 3 taken along line 5—5;

FIG. 6 is a vertical sectional view of FIG. 3 taken along line 6—6;

FIG. 7 is a fragmentary enlarged view of FIG. 3;

FIG. 8 is a vertical sectional view of FIG. 7 taken along line 8—8;

FIG. 9 is a view similar to FIG. 7 of an alternate embodiment of the invention.

Like parts are designated by like reference numerals throughout the figures of the drawings.

DETAILED DESCRIPTION OF THE PREFERRED EMBODIMENTS

Figure 1:
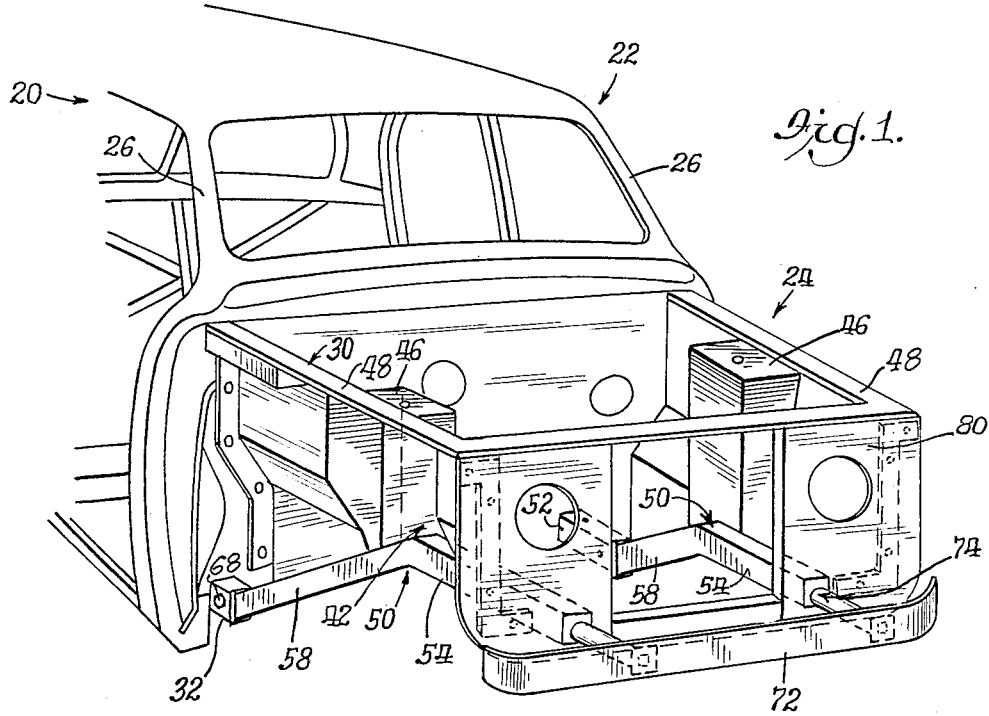
FIG. 1 is a fragmentary front perspective of a finally assembled unibody structure illustrating a preferred form of the present invention.
Figure 2:
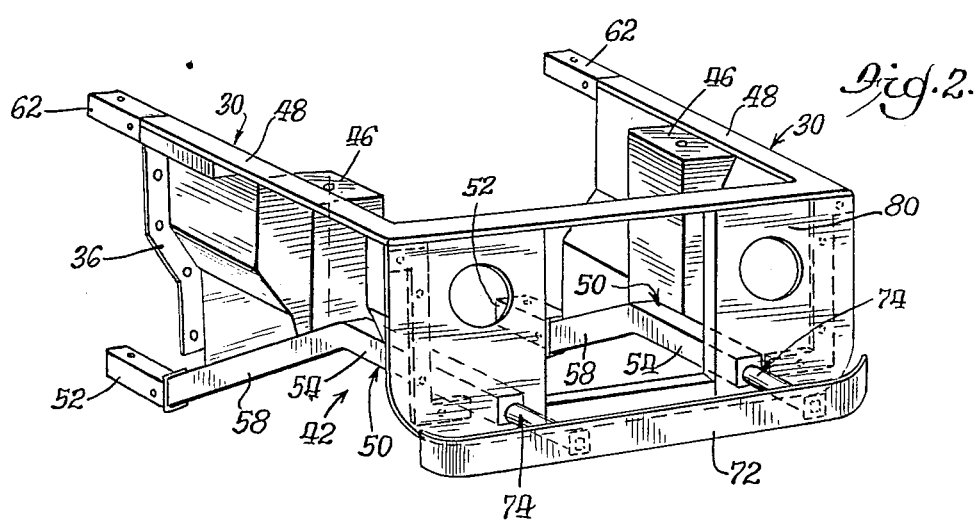
FIG. 2 is a front perspective view of the front compartment removed from the final assembly.

Referring first to the specific embodiment of the invention shown in FIGS. 1-8, a modified unitized automobile body utilizing the present invention is generally designated 20. It comprises a driver compartment 22 and a front or engine compartment 24. The front compartment is designed for support of the motor, front wheels, driving and steering gear, fenders, headlights and other accessories, none of which are specifically shown but which may be of known construction and arrangement. A pair of front, side pillars 26,26 are provided at the forward end of the driver compartment and a dash panel 28 extends transversely between the pillars to separate the compartments.

A pair of removeable inner side panel assemblies 30,30 extend forwardly from the dash panel defining the inner side walls of the front compartment and are shaped to provide generally outwardly, and downwardly concave front wheel housings.

FIG. 3 best shows the arrangement for removably mounting the front compartment. This comprises, for each side panel assembly 30, a lower socket member 32, an upper socket member 34, both with forwardly open sockets, and a rear flange 36.

Each lower socket member 32 comprises a horizontally-extending, forwardly-open tube affixed, for example by welding, to the bottom of the floor pan 38 of the body compartment. Each upper socket member 34, similarly comprises a horizontally-extending, forwardly-open tube, affixed as by welding to a corresponding one of the side pillars 26.

Each inner side panel assembly 30 has a panel 40 of sheet material shaped with an outwardly concave contour respectively providing a wheel well 42, and pockets 44 and 46 for components including headlamps, batteries, radiator overflow tanks, and front wheel supporting mechanisms such as MacPherson struts. A top, outwardly extending flange 48 stiffens the upper portion.

The inner side panel assemblies 30 and associated parts to be described provides controlled rigidity to maintain structural integrity of the front compartment during normal front-end impacts on the bumper while providing sacrificial collapsibility of the front compartment and maintaining structural integrity of the driver compartment to minimize injuries in event of a severe head-on collision. Details of the inner side panel assemblies which provide this controlled rigidity will now be described.

Figure 10:
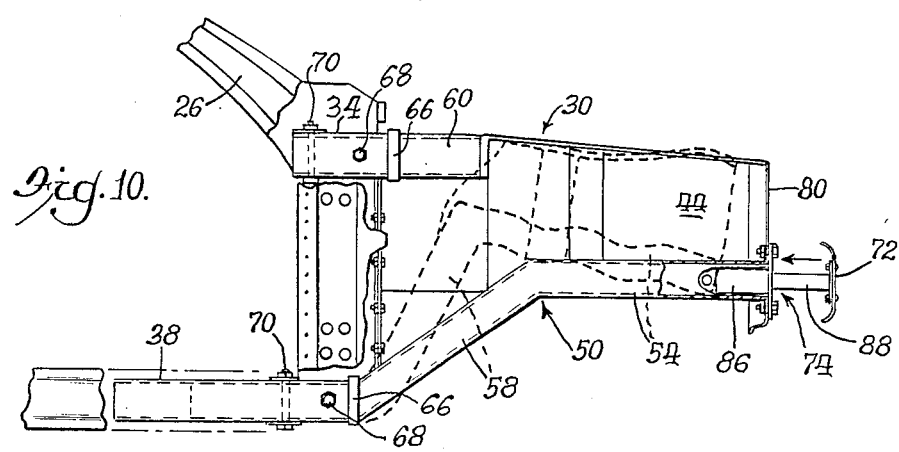
FIG. 10 is a view similar to FIG. 3 showing sacrificial collapsibility of the front compartment resulting from a head on collision.

A lower rail 50 is connected along the bottom margin of each inner panel assembly, preferably by welding for maximum strength. It has a horizontal, rearwardly extending portion 52 telescopically connectable within the corresponding lower socket member 32. The lower rail also has a horizontal front portion 54, at a higher level than the rear portion, with a forwardly open socket 56, and a diagonal, upwardly and forwardly extending intermediate connecting portion 58 capable of bending upwardly and backwardly as shown in FIG. 10 to absorb collision-magnitude impact forces transmitted backwardly through the front portion 54.

An upper rail 60 is connected at the rear of the inner panel assembly, along the top margin thereof. It will be apparent as the description proceeds that, by limiting the length of the upper rail 60 to the rear portion only of the inner panel assembly, as shown, the front compartment can collapse backwardly in event of a collision, without applying destructive forces through the pillars 26 into the body compartment, thereby preserving its structural integrity and contributing to safety of the driver and passengers. Each upper rail has a horizontal rearwardly extending portion 62 telescopically connectable within the forwardly open socket 35 of the upper socket member 34.

The rear flange 36, best shown in FIGS. 3 and 6, is connected to the front face of the dash panel 28 by bolts 64.

Shoulders or collars 66 are provided at the rear portions of the lower and upper rails 50 and 60 and are engageable with the forward ends of the socket members 32 and 34 to precisely align the front compartment and the front wheels and steering mechanism (not shown) supported thereby.

The back end portion of each rail 50 and 60 is positively held in the socket members 32, 34 by cross bolts 68 and 70. The above described shoulders 66 relieve these bolts of stress caused by backward thrust applied into the rails by bumper energy absorbing means 74 which will now be described.

As best shown in FIG. 3, front end bumper impacts are transmitted from bumper 72 to the lower rails 50 via hydraulic energy absorbers 74. Each horizontal front portion 54 of the lower rail is provided with a flange 76 welded in place as shown at 78. A front cross panel and radiator support member 80 is formed of sheet material and is connected between the forwardly open sockets 56, 56 of the lower rails to define the forward wall of the front compartment 24. Each such socket connection is strengthened by a reinforcing hollow plug 82 telescopically fitted within the socket and having an external flange 84 overlying and welded to the outside of the cross panel 80. Each bumper energy absorber 74 comprises cylinder and piston portions 86 and 88 with a flange 90 overlying flange 84. As best shown in FIG. 7, the flanges 76, 84 and 90 and cross panel 80 are removeably fastened together by a plurality (in this case 4) of bolts 92. Each cylinder portion 86 is snugly telescopically fitted within the hollow reinforcing plug 82 and is positively retained by a cross bolt 94 extending through the plug 82, walls of rail portions 54, and a rear boss 96 on the cylinder portion 86 as shown in FIGS. 7 and 8. The front bumper 72 is connected across flanges 97 on the two piston portions 88 by bolts 98.

While the flanged reinforcing plug 82 is beneficial for maximum rigidity of the connections between the inner side panel assemblies 30,30 and the front cross panel 80, the reinforcing plugs 82 one of which is shown in FIG. 7 may be eliminated in some cases and the energy absorber flange 90 may be bolted directly against the front cross panel 80 as shown in FIG. 9. In that case, the energy absorber cylinder portion 86 will be fitted directly in the forwardly open socket 56.

As best shown in FIGS. 3, 4 and 5, each inner side panel assembly 30 has an outwardly turned flange 100 connected to the backside of the front cross panel 80 by bolts 102.

To resist racking or twisting and thereby enhance rigidity of the front compartment, the forwardly open sockets 33, 35 and 56, the rear rail end portions 52, 62 and the reinforcing plug members 82 will preferably will be noncircular in cross section and fit snugly into one another. In the embodiment shown, these cross sections are square. Alternatively, they may be rectangular, or circular with keying elements to prevent relative rotation of the telescoping parts.

In the great majority of automobile accidents at least one car has front end damage. Conventional unibody cars are repaired by a variety of techniques including forcibly twisting, pushing and pulling the deformed parts or cutting them out and rewelding new structural components and panels into place. When there is substantial structural damage it is often cheaper to buy a new car than attempt to restore factory strength and alignment specifications to the old one.

By contrast, in the present invention, even the most severely damaged front compartments can be restored perfectly to original factory strength and alignment specifications.

Consider an extreme case in which the entire front compartment is totally demolished. Without using any special jigs or fixtures, or powerful bending machinery, all the repair man has to do is remove four pairs of bolts 68, 70 from the upper and lower socket members 32, 34, remove bolts 64 holding the rear flanges 36 to the dash panel 28, support the engine (not shown) and then pull off the entire front compartment and scrap components which are not reusable. Then, by replacing the removed inner side panel members 30, front cross panel member 80, and other parts and accessories comprising the front compartment, the entire front of the car can be rebuilt to precisely match original factor specifications. Compared with conventional unibody cars which are now considered total losses and scrapped, this can make available substantial overall savings in material and labor and provide great savings in automobile maintenance and insurance costs.

While particular examples of the present invention have been shown and described, it will be apparent that changes and modifications may be made therein without departing from the invention in its broadest aspects. The aim of the appended claims, therefor, is to cover all such changes and modifications included within the spirit and scope of the invention.

The embodiments of the invention in which an exclusive property or privilege is claimed are defined as follows:

1. A unitized automobile body having a driver compartment and a front compartment, a pair of front side pillars at the forward end of the driver compartment and a transverse dash panel between the pillars separating said compartments;
   a pair of removable inner side panel assemblies extending forwardly from the dash panel defining the inner side walls of the front compartment and providing front wheel housings;
   a lower socket member with a forwardly open socket fastened to the bottom of the driver compartment along each side thereof;
   an upper socket member with a forwardly open socket fastened to the front pillar at each side of the driver compartment;
   each inner side panel assembly including a panel formed with pockets for front wheel supporting means and headlamp means;
   means for supporting and removably connecting each inner side panel assembly to the driver compartment with controlled rigidity providing sacrificial collapsibility of the front compartment in event of a head-on collision including upper and lower horizontal rails and flange means;
   each lower rail being connected along the lower margin of the inner side panel assembly and having a horizontal rearwardly extending portion telescopically connectible with the respective lower socket member, a horizontal front portion being disposed at a higher level than said rearwardly extending portion and having a forwardly open socket, and a diagonal intermediate, connecting portion capable of bending under backward, collision-magnitude force transmitted through said horizontal front portion;
   each upper rail being connected along the rear portion of the upper margin of the inner side panel assembly and having a horizontal rearwardly extending portion telescopically connectible with the respective upper socket member;
   said flange means extending along the rear margin of the inner side panel assembly and being connectible by first fastener means to the forward face of the dash panel;
   second fastener means holding said rearwardly extending portions of the lower and upper rails removably mounted within the respective socket members;
   shoulder means acting between the rails and respective socket members to relieve said second fastener means of stress caused by backward thrust through the rails; a front cross panel and radiator support member connected between the front ends of the inner side panel assemblies and defining the inner front wall of the front compartment; and
   energy absorbing means fitted within each of the forwardly open sockets in the front portions of the lower rails and connected to front bumper means.

2. A unitized automobile body according to claim 1 in which said front cross panel has a pair of rearwardly extending, reinforcing hollow plug members telescopically connectible in said forwardly open sockets in the front portions of the lower rails, and said energy absorbing means are telescopically connectible with said hollow plug members.

3. A unitized automobile body according to claim 2 in which said forwardly open sockets in said lower and upper socket members and in the front portions of said lower rails, and the rearwardly extending portions of the rails and the reinforcing hollow plug members engaged therewith, are non-circular in cross-section to minimize racking and enhance rigidity of the front compartment structure.

4. A unitized automobile body according to claim 3 in which at least said rearwardly extending portions of the rails and the corresponding forwardly open sockets within which they are telescopically connectible are square in cross-section, and said second fastener means for each such telescopical connection comprises a pair of bolts spaced apart along the connection and arranged at right angles to one another.

5. A unitized automobile body according to claim 2 in which each of said energy absorbing means is connectible within the respective hollow plug member by bolt means extending transversely through it and through the corresponding forwardly open socket in the front portion of the lower rail, and each said hollow plug member has a flange engageable with the front end of the respective lower rail to relieve said bolt means of stress caused by backward thrust exerted through the corresponding energy absorbing means.

* * * * *

UNITED STATES PATENT AND TRADEMARK OFFICE
CERTIFICATE OF CORRECTION

PATENT NO. : 4,573,734
DATED : March 4, 1986
INVENTOR(S) : Gene C. Gass

It is certified that error appears in the above—identified patent and that said Letters Patent is hereby corrected as shown below:

Column 6, line 40, change "with" to -- within --.

Signed and Sealed this

Eighth Day of July 1986

[SEAL]

Attest:

Attesting Officer

DONALD J. QUIGG

Commissioner of Patents and Trademarks